United States Patent
Vasquez Lopez et al.

(10) Patent No.: US 10,684,989 B2
(45) Date of Patent: Jun. 16, 2020

(54) TWO-PHASE EVICTION PROCESS FOR FILE HANDLE CACHES

(75) Inventors: Daniel Vasquez Lopez, Duvall, WA (US); Won Yoo, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1027 days.

(21) Appl. No.: 13/160,963

(22) Filed: Jun. 15, 2011

(65) Prior Publication Data

US 2012/0323872 A1    Dec. 20, 2012

(51) Int. Cl.
*G06F 16/00* (2019.01)
*G06F 16/172* (2019.01)

(52) U.S. Cl.
CPC .................. *G06F 16/172* (2019.01)

(58) Field of Classification Search
CPC .......... G06F 16/10; G06F 16/13; G06F 16/27; G06F 16/119; G06F 16/134; G06F 16/172; G06F 16/182; G06F 16/183; G06F 16/188; G06F 16/1748; G06F 16/1774; G06F 16/1827; G06F 16/1847; G06F 16/1873; G06F 16/9574
See application file for complete search history.

(56) References Cited

U.S. PATENT DOCUMENTS

| | | | | |
|---|---|---|---|---|
| 5,301,290 A | * | 4/1994 | Tetzlaff | G06F 12/0815 711/142 |
| 5,410,697 A | * | 4/1995 | Baird | G06F 12/0815 710/200 |
| 5,490,270 A | * | 2/1996 | Devarakonda | G06F 16/10 707/999.201 |
| 5,805,809 A | * | 9/1998 | Singh | G06F 12/0813 709/203 |
| 5,809,527 A | * | 9/1998 | Cooper | G06F 12/0866 707/999.2 |
| 5,946,690 A | * | 8/1999 | Pitts | G06F 12/0813 707/999.01 |
| 6,101,508 A | * | 8/2000 | Wolff | G06F 9/52 709/223 |

(Continued)

OTHER PUBLICATIONS

"Disk Cache", Retrieved at <<http://www.chromium.org/developers/design-documents/network-stack/disk-cache>>, Retrieved Date: Apr. 7, 2011, pp. 10.

(Continued)

*Primary Examiner* — Ashish Thomas
*Assistant Examiner* — Rezwanul Mahmood
(74) *Attorney, Agent, or Firm* — Fiala & Weaver P.L.L.C.

(57) ABSTRACT

Systems and methods are provided for evicting entries from a file handle cache. In accordance with certain embodiments, a two-stage eviction process is utilized. In a first stage of the eviction process, entries in the file entry cache are analyzed and marked for eviction while a shared lock is maintained on the file handle cache. The shared lock enables the file handle cache to be concurrently accessed by a content serving system to service content requests. In a second stage of the eviction process, entries in the file handle cache that are marked for eviction are removed while an exclusive lock is maintained on the file handle cache. The exclusive lock prevents the content serving system from concurrently accessing the file handle cache to service content requests.

20 Claims, 9 Drawing Sheets

(56) References Cited

U.S. PATENT DOCUMENTS

| | | | |
|---|---|---|---|
| 6,185,601 B1* | 2/2001 | Wolff | G06F 16/10 709/203 |
| 6,324,581 B1 | 11/2001 | Xu et al. | |
| 6,338,115 B1* | 1/2002 | Galbraith et al. | 711/113 |
| 6,389,510 B1* | 5/2002 | Chen | G06F 16/9574 711/113 |
| 6,389,517 B1 | 5/2002 | Moudgal et al. | |
| 6,496,850 B1* | 12/2002 | Bowman-Amuah | G06F 9/4493 709/203 |
| 6,842,770 B1* | 1/2005 | Serlet | H04L 29/06 709/203 |
| 6,862,606 B1* | 3/2005 | Major | H04L 29/06 709/203 |
| 6,925,536 B2 | 8/2005 | Glasco et al. | |
| 7,103,616 B1* | 9/2006 | Harmer | G06F 16/9574 707/999.201 |
| 7,117,504 B2* | 10/2006 | Smith | G06F 8/20 719/328 |
| 7,143,393 B1* | 11/2006 | Ezra | G06F 12/084 711/118 |
| 7,185,029 B1* | 2/2007 | Titus | G06F 16/10 707/999.203 |
| 7,185,047 B1* | 2/2007 | Bate | H04L 63/08 709/202 |
| 7,640,395 B2* | 12/2009 | Coulson et al. | 711/113 |
| 7,822,927 B1* | 10/2010 | Scheer | G06F 12/0866 707/829 |
| 7,849,502 B1* | 12/2010 | Bloch | H04L 29/12066 726/11 |
| 8,041,735 B1* | 10/2011 | Lacapra | G06F 16/13 707/783 |
| 8,117,159 B2* | 2/2012 | Neumann et al. | 707/638 |
| 8,204,871 B1* | 6/2012 | Pawar | G06F 16/172 707/705 |
| 8,745,707 B2 | 6/2014 | Sadjadi | |
| 9,317,469 B2* | 4/2016 | Gross | G06F 12/0813 |
| 2002/0073167 A1* | 6/2002 | Powell et al. | 709/217 |
| 2003/0028695 A1* | 2/2003 | Burns | G06F 16/1774 710/200 |
| 2004/0111422 A1* | 6/2004 | Devarakonda | G06F 9/526 707/999.1 |
| 2004/0117600 A1* | 6/2004 | Bodas | H04L 29/06 712/210 |
| 2004/0133573 A1* | 7/2004 | Miloushev | G06F 16/10 707/999.008 |
| 2004/0133606 A1* | 7/2004 | Miloushev | H04L 29/06 707/999.2 |
| 2004/0255048 A1* | 12/2004 | Lev Ran | G06F 9/546 709/249 |
| 2005/0066095 A1* | 3/2005 | Mullick | G06F 16/1774 710/200 |
| 2005/0154805 A1* | 7/2005 | Steely, Jr. | G06F 9/30043 710/52 |
| 2005/0216554 A1* | 9/2005 | Meiman | H04L 67/1008 709/203 |
| 2005/0251500 A1* | 11/2005 | Vahalia | G06F 16/1774 707/999.001 |
| 2006/0064549 A1* | 3/2006 | Wintergerst | G06F 12/121 711/134 |
| 2006/0248124 A1* | 11/2006 | Petev | G06F 12/0842 707/999.201 |
| 2006/0248131 A1* | 11/2006 | Marwinski | G06F 9/52 707/999.206 |
| 2006/0248284 A1* | 11/2006 | Petev | G06F 9/526 711/141 |
| 2006/0248285 A1* | 11/2006 | Petev | G06F 12/084 711/141 |
| 2006/0288047 A1* | 12/2006 | Chron | G06F 16/162 707/999.2 |
| 2007/0005889 A1* | 1/2007 | Matthews | G06F 12/0888 711/118 |
| 2007/0055702 A1 | 3/2007 | Fridella et al. | |
| 2007/0079037 A1* | 4/2007 | Scoredos | G06F 9/52 710/200 |
| 2007/0162462 A1* | 7/2007 | Zhang | G06F 16/10 707/999.01 |
| 2007/0226320 A1* | 9/2007 | Hager | G06F 16/137 709/219 |
| 2008/0147665 A1* | 6/2008 | Brjazovski | G06F 9/52 707/999.008 |
| 2008/0235292 A1* | 9/2008 | Janin | H04L 67/1095 707/999.201 |
| 2009/0063489 A1* | 3/2009 | Neumann | G06F 16/2343 707/999.008 |
| 2009/0106255 A1* | 4/2009 | Lacapra | G06F 11/1076 707/999.01 |
| 2009/0144388 A1* | 6/2009 | Gross | G06F 12/0813 709/213 |
| 2009/0198899 A1* | 8/2009 | Revanuru | G06F 12/0842 711/128 |
| 2009/0327360 A1* | 12/2009 | Rajaram | G06F 12/0891 707/999.204 |
| 2010/0185704 A1* | 7/2010 | George | G06F 12/0815 707/821 |
| 2010/0235907 A1* | 9/2010 | Bowman | G06F 21/6218 726/21 |
| 2010/0274772 A1* | 10/2010 | Samuels | G06F 16/1748 707/693 |
| 2010/0293338 A1* | 11/2010 | Krishnaprasad | G06F 12/0813 711/136 |
| 2011/0072218 A1* | 3/2011 | Manne et al. | 711/136 |
| 2011/0252408 A1* | 10/2011 | Tzoref | G06F 11/3471 717/131 |
| 2011/0264865 A1* | 10/2011 | Mobarak | G06F 16/2246 711/141 |
| 2012/0054435 A1* | 3/2012 | Arnold | G06F 9/30018 711/118 |
| 2012/0054444 A1* | 3/2012 | Wang | G06F 16/27 711/133 |
| 2012/0072400 A1* | 3/2012 | Allred | G06F 16/1774 707/704 |
| 2012/0259969 A1* | 10/2012 | Mastrangelo | G06F 11/3419 709/224 |
| 2012/0323872 A1* | 12/2012 | Vasquez Lopez | G06F 16/172 707/704 |
| 2013/0073669 A1* | 3/2013 | Roberts | H04L 29/08306 709/214 |

OTHER PUBLICATIONS

"Storage Options", Retrieved at <<http://ehcache.org/documentation/storage_options.html>>, Retrieved date: Apr. 8, 2011, pp. 5.

Otoo, et al., "Disk Cache Replacement Algorithm for Storage Resource Managers in Data Grids", 2002, pp. 1-15, IEEE.

* cited by examiner

TWO-PHASE EVICTION PROCESS FOR FILE HANDLE CACHES

BACKGROUND

Content serving systems exist that receive requests for content from clients and service such requests by obtaining requested content from files stored on a file system. One example of such a content serving system is a disk caching system. A disk caching system stores frequently-accessed content obtained from a remote content source (or from another disk caching system) in a file system so that it can service requests for such frequently-accessed content directly therefrom. However, this is only one example, and there are numerous other types of content serving systems that service client content requests by obtaining data from files stored in a file system.

To obtain data from a file stored in the file system, such a content serving system must request that the file system open the file. Opening a file is an operation that carries considerable overhead in terms of memory, disk input/output (I/O) and CPU cycles. If the number of files that must be opened to service content requests is very large, then the associated overhead may adversely impact system performance consequently, some content serving systems are configured to keep files open even after they have been accessed to service a content request. In this way, subsequent requests for the same content can be serviced without re-opening the files and incurring the associated overhead. These systems often utilize a file handle cache to store file handles to currently-opened files.

However, if too many file handles are kept open concurrently, other problems may arise. For example, in certain massive disk caching scenarios, thousands of handles to files are kept open. This causes high memory consumption, especially when the file system keeps the accessed file content cached (i.e., resident in system memory). To avoid consuming all or substantially all of the system memory, it is important to accurately identify and evict file handles from the file handle cache that are not so frequently used. Furthermore, any such eviction process must be carried out in a way that only minimally impedes the ability of the content serving system to access the file handle cache to service content requests, thereby avoiding bottlenecks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

Systems and methods are described herein for evicting entries from a file handle cache in a manner that accurately identifies and evicts file handles that are not so frequently used during a recent time period and that also minimally impedes the ability of a content serving system to access the file handle cache to service content requests. In accordance with certain embodiments, a two-stage eviction process is utilized. In a first stage of the eviction process, entries in the file entry cache are analyzed and marked for eviction while a shared lock is maintained on the file handle cache. Such analysis and marking may be based on time to live values and hit counts associated with each entry as will be described herein. The shared lock enables the file handle cache to be concurrently accessed by a content serving system to service content requests. In a second stage of the eviction process, entries in the file handle cache that are marked for eviction are removed while an exclusive lock is maintained on the file handle cache. The exclusive lock prevents the content serving system from concurrently accessing the file handle cache to service content requests. During the second stage, entries marked for eviction may be moved to a deletion list and files associated with file handles identified in the deletion list may subsequently be closed without maintaining any lock on the file handle cache.

In particular, a method for evicting entries from a file handle cache is described herein, wherein each entry in the file handle cache stores a file handle associated with an open file in a file system. In accordance with the method, while maintaining a shared lock on the file handle cache, each entry in the file handle cache is analyzed to identify entries to be marked for eviction and the identified entries are marked for eviction. The shared lock allows the file handle cache to be concurrently accessed by one or more processes to obtain file handles for use in servicing requests for content from the file system. Then, while maintaining an exclusive lock on the file handle cache, the entries marked for eviction are removed from the file handle cache. The exclusive lock prevents the file handle cache from being concurrently accessed by the one or more processes.

In accordance with one embodiment of the foregoing method, removing the entries marked for eviction from the file handle cache includes moving the entries marked for eviction to a deletion list. In further accordance with such an embodiment, the method may further include issuing commands to the file system to close each open file associated with a file handle stored in the deletion list while not maintaining any lock on the file handle cache.

In accordance with a further embodiment of the foregoing method, analyzing each entry in the file handle cache to identify entries to be marked for eviction includes determining if a time to live value associated with each entry has expired and identifying an entry as an entry to be marked for eviction if the time to live value associated therewith has expired. This step may also include modifying the time to live value associated with each entry if a measure of system memory utilization exceeds a threshold.

In accordance with a still further embodiment of the foregoing method, analyzing each entry in the file handle cache to identify entries to be marked for eviction includes comparing a hit count associated with each entry to a statistical threshold, the hit count associated with each entry representing a number of times that the entry was accessed to service a request for content from the file system, and identifying an entry as an entry to be marked for eviction if the hit count associated therewith is less than the statistical threshold. The statistical threshold may be calculated based on the hit counts associated with all of the entries and may comprise, for example, a standard deviation that is calculated based on the hit counts associated with all of the entries. This step may further include resetting a hit count associated with an entry if a predetermined amount of time has elapsed since a last time that the hit count associated with the entry was reset. Resetting the hit count may comprise resetting the hit count to a mean value that is calculated based on the hit counts associated with all of the entries.

A system is also described herein. The system includes a file system and a content serving system that services request for content by accessing files on the file system. The content serving system itself includes a file handle cache and file handle cache management logic. The file handle cache has a plurality of entries, each entry in the file handle cache storing a file handle associated with an open file in the file system. The file handle cache is accessible to obtain file handles for accessing open files on the file system. The file handle cache management logic is operable to analyze a time to live counter assigned to each entry in the file handle cache and to mark an entry for eviction if the time to live counter assigned thereto has expired, the value of the time to live counter that is assigned to each entry in the file handle cache being adaptively determined based on a measure of system resource utilization.

Another system is described herein. The system includes a file system and a content serving system that services request for content by accessing files on the file system. The content serving system itself includes a file handle cache and file handle cache management logic. The file handle cache has a plurality of entries, each entry in the file handle cache storing a file handle associated with an open file in the file system. The file handle cache is accessible to obtain file handles for accessing open files on the file system. The file handle cache management logic is operable to analyze a hit count associated with each entry in the file handle cache and to mark an entry for eviction if the hit count is less than a statistical threshold. The hit count associated with each entry represents a number of times that the entry was accessed to service a request for content from the file system.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
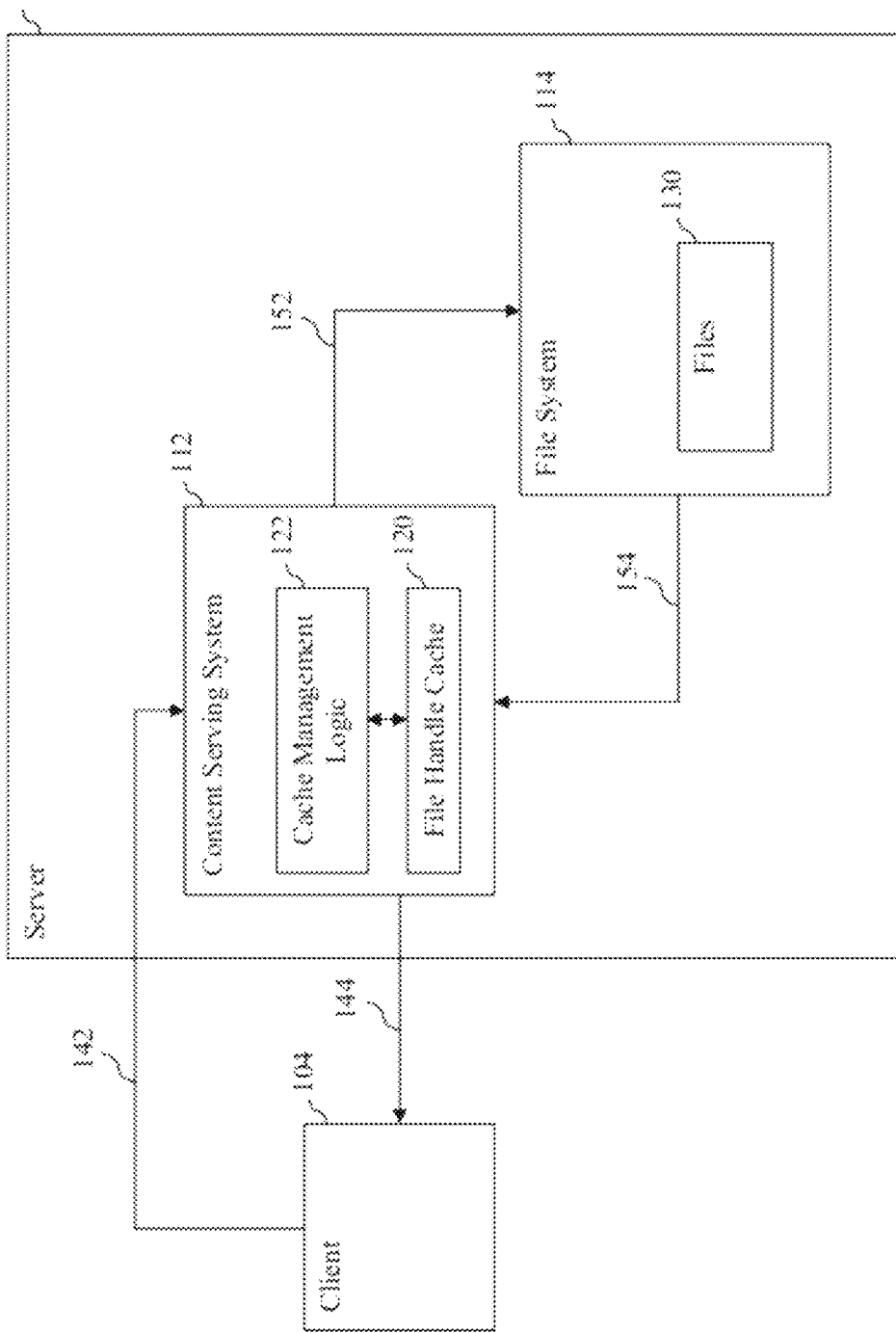
FIG. 1 is a block diagram of an example system that implements an eviction process for a file handle cache in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Systems that Implement an Eviction Process for a File Handle Cache in Accordance with Embodiments FIG. 1 is a block diagram of an example system 100 that implements an eviction process for a file handle cache in accordance with an embodiment. As shown in FIG. 1, system 100 includes a server 102 that is communicatively connected to a client 104. A content serving system 112 and a file system 114 are implemented on server 102. Content serving system 112 includes a file handle cache 120 and associated cache management logic 122, while file system 114 stores a plurality of files 130.

Content serving system 112 is operable to receive a request for content 142 from client 104 and to service the request by obtaining the requested content from a file stored by file system 114. To obtain the requested content, content serving system 112 issues a file access request 152 to file system 114, wherein the file access request 152 identifies a file from which the requested content is to be obtained. Responsive to receiving file access request 152, file system 114 obtains and returns the requested content 154 to content serving system 112 and, in turn, content serving system 112 returns the requested content 144 to client 104. Although only a single client 104 is shown in FIG. 1, it is to be appreciated that content serving system 112 may be operable to service requests for content from any number of clients, including tens, hundreds, or even thousands of clients. Content serving system 112 may service each such request in a like manner to that described above.

When file system 114 first opens a file to obtain content requested by content serving system 112, file system 114 generates a file handle associated with the file. A file handle is a unique identifier of an open file that file system 114 stores in association with information concerning the open file. In some embodiments, a file handle comprises an index or a key to a data structure utilized by file system 114 to store details concerning currently open files, although this example is not intended to be limiting. When file system 114 returns requested content from a file to content serving system 112 after it first opens the file, it also returns the file handle associated with the file to content serving system 112. Content serving system 112 is configured to store the file handle in file handle cache 120 for so long it keeps the file open.

Opening a file is an operation that carries considerable overhead in terms of memory, disk input/output (I/O) and CPU cycles. If the number of files that must be opened to service content requests is very large, then the associated overhead may adversely impact system performance. To address this issue, content serving system 112 is configured to keep files open even after they have been accessed to service a content request. In this way, content serving system 112 can service subsequent requests for the same content without re-opening the files and incurring the associated overhead.

Content serving system 112 utilizes file handle cache 120 to store file handles associated with currently-open files. When a request for content is received from a client, content serving system 112 determines if the requested content is located in a file stored by file system 114. If the requested content is located in a file stored by file system 114, then content serving system 112 searches file handle cache 120 to determine if a file handle to the relevant file is stored therein and, if the file handle is stored in the cache, then content serving system 112 will send a file access request to file system 114 that includes the relevant file handle. Content serving system 112 is further configured to cause file system 114 to close a file only after a file handle associated with that file has been evicted from file handle cache 120.

If content serving system 112 keeps too many file handles open concurrently, then high memory consumption may occur, especially in an implementation in which file system 114 is configured to keep accessed file content cached (i.e., resident in system memory of server 102). To avoid consuming all or substantially all of the system memory, it is important to accurately identify and evict file handles from file handle cache 120 that are not so frequently used. Furthermore, any such eviction process must be carried out in a way that only minimally impedes the ability of content serving system 112 to access file handle cache 120 to service content requests, thereby avoiding bottlenecks.

To achieve this, cache management logic 122 implements a process for evicting entries from file handle cache 120 in a manner that accurately identifies and evicts file handles that are not so frequently used during a recent time period and that also minimally impedes the ability of content serving system 112 to access file handle cache. Various implementations of this process will be described below in Section III.

As will be discussed below, in accordance with certain embodiments, a two-stage eviction process is utilized. In a first stage of the eviction process, cache management logic 122 analyzes entries in file entry cache 120 to identify which entries should be marked for eviction and marks the identified entries for eviction while maintaining a shared lock on file handle cache 120. Such analysis and marking may be based on time to live values and hit counts associated with each entry as will be described below. By maintaining only a shared lock on file handle cache 120 during the first stage of the eviction process, cache management logic 122 enables file handle cache 120 to be concurrently accessed by content serving system 112 to service content requests. Thus, the first stage of the eviction process can apply sophisticated techniques for determining which entries should be marked for eviction, but the application of such techniques will not results in content serving bottlenecks.

In a second stage of the eviction process, cache management logic 122 removes entries in file handle cache 120 that are marked for eviction while an exclusive lock is maintained on file handle cache 120. It is noted that some entries marked for eviction as part of the first stage of the eviction process may have been unmarked due to cache accesses that occurred after the marking operation but before the exclusive lock was obtained. The exclusive lock prevents content serving system 112 from concurrently accessing file handle cache 120 to service content requests while entries are being removed from file handle cache 120. During the second stage, cache management logic 122 may move entries marked for eviction to a deletion list. Cache management logic 122 may then request that file system 114 close any files having file handles included in the deletion list without maintaining any lock on file handle cache 120. In this manner, only low-cost operations involving removing entries from file handle cache 120 are performed while maintaining an exclusive lock on file handle cache 120, thereby minimizing the amount of time that content serving system 112 is unable to access file handle cache 120 to service content requests.

Server 102 of system 100 may comprise a processor-based computer system, an example of which will be provided below in Section IV, although this example is not intended to be limiting. In accordance with such an embodiment, content serving system 112 (including cache management logic 122) may comprise one or more program modules that are stored in memory associated with server 102 and that are executed by a processing unit to perform operations described herein. File handle cache 120 may likewise be stored in memory associated with server 102.

File system 114 is intended to represent a component of server 102 that is operable to name, store, access and organize files. At least some of the functionality of file system 114 may be implemented as part of an operating system that is executed on server 102. In one embodiment, file system 114 stores files, directories and the information needed to locate and access such items. File system 114 may be capable of storing files to a variety of physical media, including but not limited to one or more hard disk drives, solid state drives, optical discs, magnetic tapes, flash memory devices, or the like. File system 114 may comprise an integrated part of server 102 or may be connected thereto via a network connection or other connection. In accordance with certain embodiments, file system 114 comprises a file system that is shared by a plurality of servers. In accordance with certain other embodiments, file system 114 comprises a network file system that is remotely located with respect to server 102 and is accessed via one or more network connections.

Client 104 is intended to represent any system or device that is capable of sending content requests to server 102 and receiving requested content therefrom. By way of example only, and without limitation, client 104 may comprise a desktop computer, a laptop computer, a tablet computer, a smart phone, a personal digital assistant, a video gaming console, a personal media player, or the like. One example of a processor-based computer system that may be used to implement client 104 is provided below in Section IV.

In certain embodiments, communication between client 104 and server 102 is carried out over a network or combination of networks. Such network(s) may include, for example, the Internet. However, this example is not intended to be limiting, and communication between such entities may be carried out over any type of network or combination of networks including one or more wide area networks (WANs), local area networks (LANs), private networks, public networks, packet networks, circuit-switched networks, and wired or wireless networks.

Figure 2:
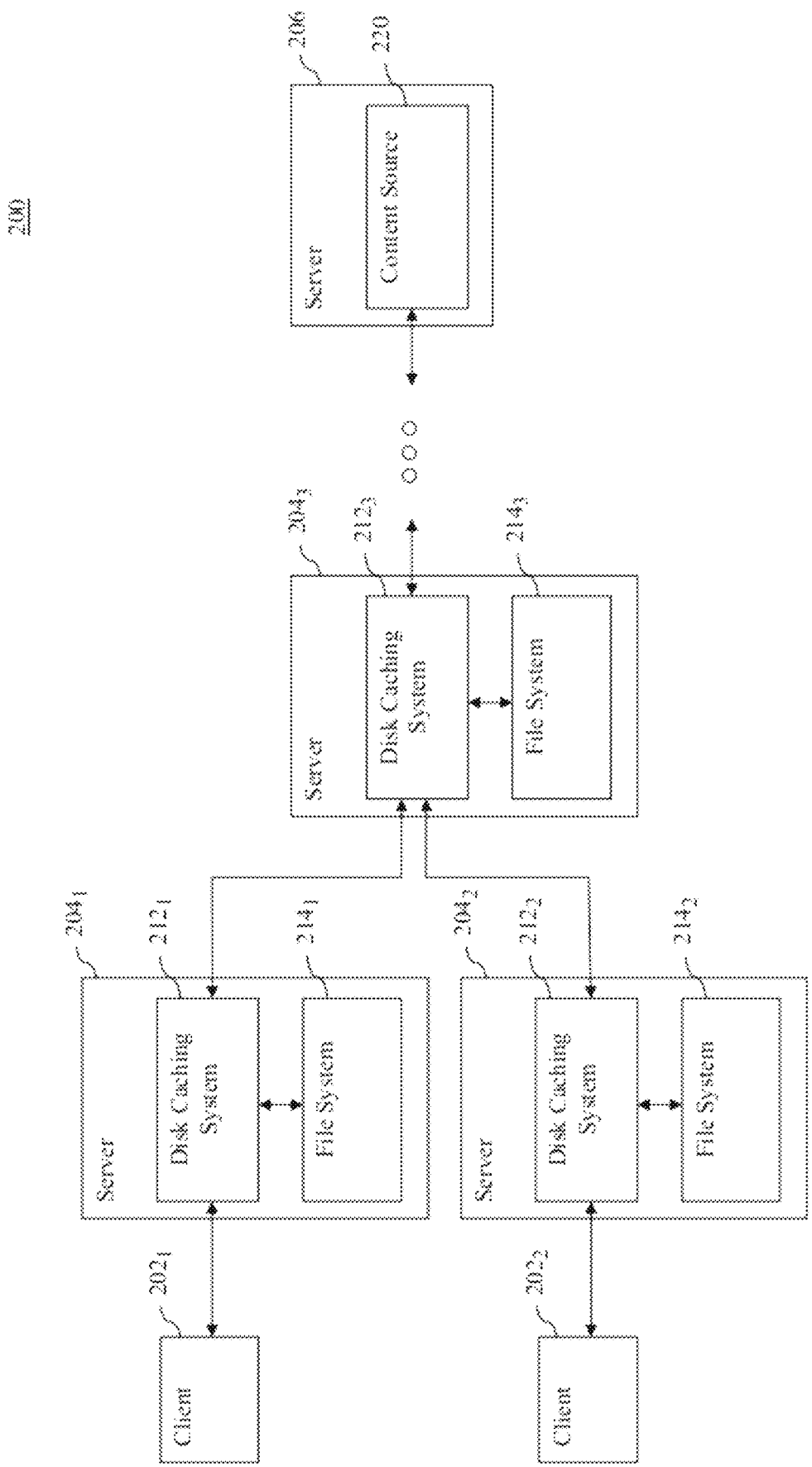
FIG. 2 is a block diagram of a content delivery system that includes a plurality of disk caching systems, each of which implements an eviction process for a file handle cache in accordance with an embodiment.

FIG. 2 is a block diagram of a content delivery system 200 that includes a plurality of disk caching systems, each of which implements an eviction process for a file handle cache in accordance with an embodiment. Content delivery system 200 represents a particular operating environment in which an eviction process in accordance with an embodiment may be used.

As shown in FIG. 2, content delivery system 200 includes a plurality of servers $204_1$-$204_3$ that are arranged in a hierarchical manner. Such servers $204_1$-$204_3$ are used to deliver content from content sources, such as content source 220, to clients, such as clients $202_1$ and $202_2$. Each server $204_1$-$204_3$ implements a corresponding disk caching system $212_1$-$212_3$ and a corresponding file system $214_1$-$214_3$. Each disk caching system $212_1$-$212_3$ represents one example of content serving system 112 of FIG. 1 while each file system $214_1$-$214_3$ represents one example of file system 114 of FIG. 1.

Disk caching system $212_1$ is operable to receive a content request from client $202_1$ and to determine if the content request can be serviced from files stored in file system $214_1$. If the content request can be serviced from files stored in file system $214_1$, then disk caching system $212_1$ will service the content request in that manner. However, if the content request cannot be serviced from files stored in file system $214_1$, then disk caching system $212_1$ will pass the content request to "parent" disk caching system $212_3$ implemented on server $204_3$.

In a like manner to disk caching system $212_1$, disk caching system $212_2$ is operable to receive a content request from client $202_2$ and to determine if the content request can be serviced from files stored in file system $214_2$. If the content request can be serviced from files stored in file system $214_2$, then disk caching system $212_2$ will service the content request in that manner. However, if the content request cannot be serviced from files stored in file system $214_2$, then disk caching system $212_2$ will pass the content request to "parent" disk caching system $212_3$ implemented on server $204_3$.

Disk caching system $212_3$ will operate in a like manner to disk caching systems $212_1$ and $212_2$ and either service content requests received from "child" disk caching systems $212_k$ and $212_2$ from file system $214_3$ or pass such content requests up to another "parent" disk caching system (not shown in FIG. 2). If none of the disk caching systems to which a content request is passed in the hierarchy of disk caching systems can service the request from an associated file system, then the content request may be serviced by an original content source 220 residing on server 206. As the requested content is passed back downstream through various disk caching systems (such as disk caching system $212_1$-$212_3$) to clients $202_1$ or $202_2$, each disk caching system may store the requested content in an associated file system to service subsequent requests for the same content. Each disk caching system may operate to store only the most frequently accessed content in an associated file system.

As can be seen from the foregoing description of content delivery system 200, each disk caching system $212_1$-$212_3$ may be required to interact with corresponding file systems $214_1$-$214_3$ to access requested content that is cached therein. In accordance with certain embodiments, each disk caching system $212_1$-$212_3$ is configured to reduce system overhead by keeping files open even after they have been accessed to service a content request and to store file handles associated with such open files in a file handle cache, such as file handle cache 120 described above in reference to FIG. 1. In further accordance with such embodiments, each disk caching system $212_1$-$212_3$ includes cache management logic, such as cache management logic 122 described above in reference to FIG. 1, that implements a process for evicting entries from the file handle cache in a manner that accurately identifies and evicts file handles that are not so frequently used and that also minimally impedes the ability of the disk caching system to access file handle cache. Various implementations of this process will be described below in Section III.

III. Example Eviction Processes for a File Handle Cache in Accordance with Embodiments Eviction processes for a file handle cache in accordance with various embodiments will now be described. Each of the processes and steps described in this section is presented by way of example only and is not intended to be limiting. Based on the teachings contained herein, persons skilled in the relevant art(s) will appreciate that additional or alternative processes or steps may be used to achieve similar results.

Figure 3:
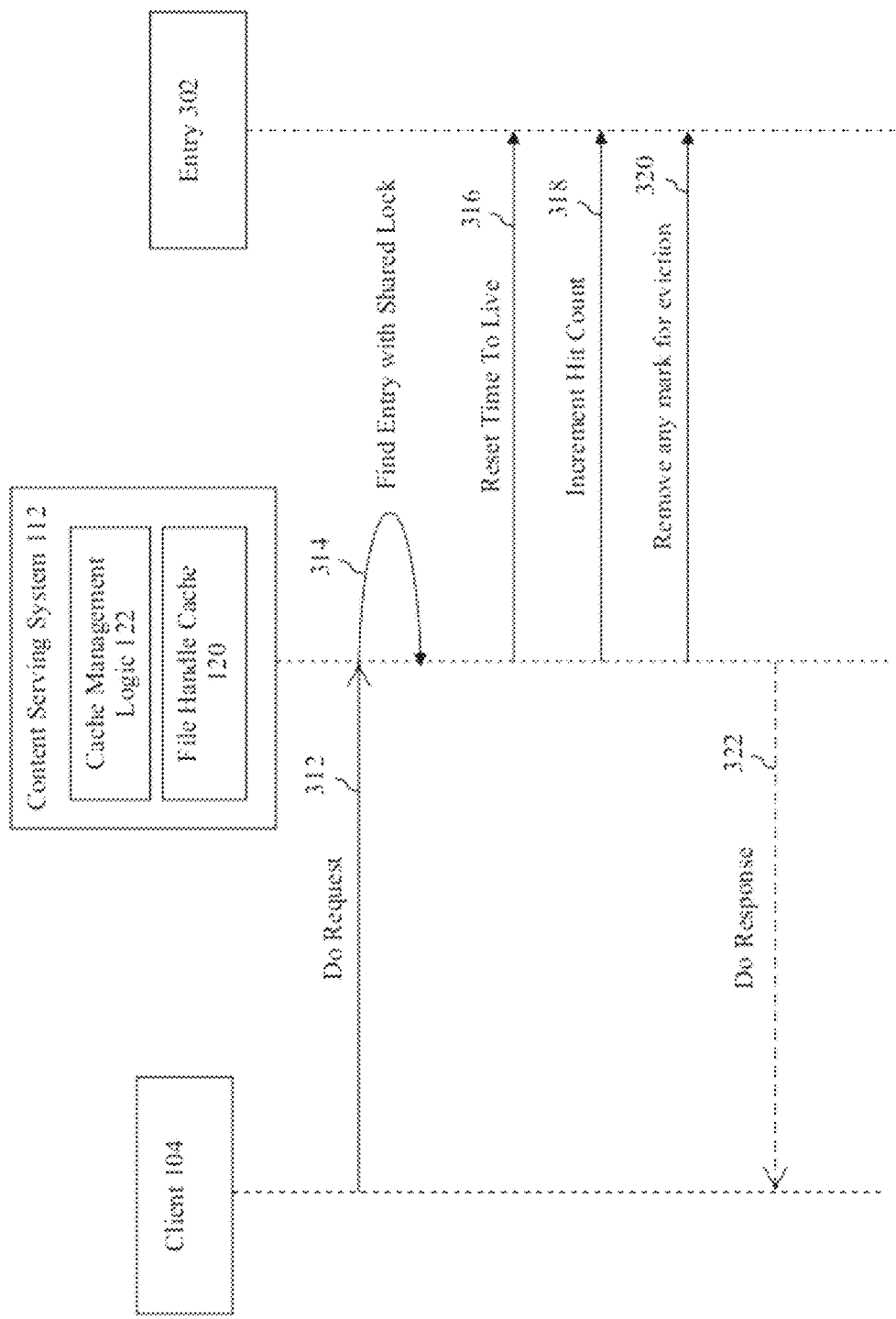
FIG. 3 is a sequence diagram that illustrates how an entry in a file handle cache is updated when such entry is accessed to service a content request in accordance with an embodiment.

FIG. 3 is a sequence diagram 300 that illustrates how an entry in a file handle cache is updated when such entry is accessed to service a content request in accordance with an embodiment. The description of sequence diagram 300 is intended to help illustrate how certain elements of an entry that are relied upon for performing an eviction process may be set. In accordance with this description, an entry in a file system cache includes a filename or other descriptor of a file, a file handle associated with the file, a time to live, a hit count, and at least one eviction indicator.

As shown in FIG. 3, the sequence of operations included in sequence diagram 300 begins with client 104 sending a request for content 312 (denoted "Do Request") to content serving system 112. In response to receiving request for content 312, cache management logic 122 of content serving system 112 finds an entry 302 in file handle cache 120 that corresponds to the requested content while maintaining a shared lock on file handle cache 120. This is represented as operation 314 in sequence diagram 300. Finding entry 302 may involve, for example, matching a filename or other identifier of the requested content with a filename or identifier associated with entry 302.

Once entry 302 is found, cache management logic 122 performs a number of operations upon entry 302 while continuing to maintain a shared lock on file handle cache 120. In particular, cache management logic resets a time to live associated with entry 302 to a predetermined maximum value (e.g., 2), as represented by operation 314. As will be described herein, the time to live is used by an eviction process to determine how long entry 302 is allowed to remain in file handle cache 120. Thus, accessing an entry in file handle cache 120 will tend to extend the time that the entry remains in file handle cache. Cache management logic 122 also increments a hit count associated with entry 302, as represented by operation 318. The hit count represents a number of times that entry 302 has been accessed to service a request for content from file system 114 since a last time the hit count was reset. As will also be described herein, the hit count is utilized by an eviction process to identify entries for eviction from file handle cache 120. Finally, cache management logic 122 removes any mark for eviction associated with entry 302 as represented by operation 320. This ensures that the entry will not be removed from file handle cache 120 by a second stage of an eviction process to be described herein.

By maintaining a shared lock on file handle cache 120 during operations 314, 316, 318 and 320, cache management logic 122 ensures that file handle cache 120 remains accessible to other processes that also acquire a shared lock on file handle cache 120. Such processes may include other processes that access file handle cache 120 to service requests for content from file system 114 or a first stage of an eviction process to be described herein.

After operation 320, content serving system 112 uses the file handle included in entry 302 to obtain requested content from file system 114. The requested content is then returned as a response 322 (denoted "Do Response") to client 104 as shown in FIG. 3.

Figure 4:
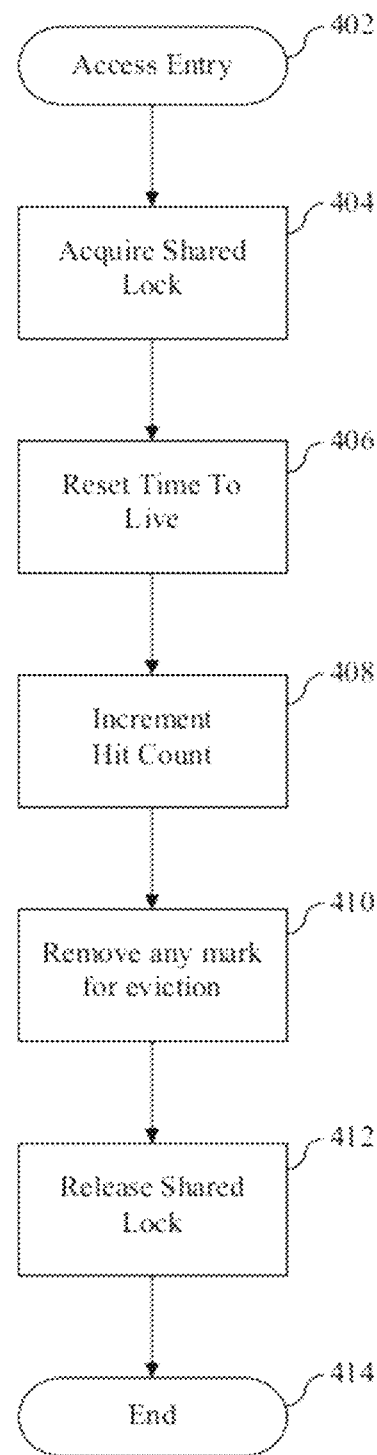
FIG. 4 depicts a flowchart of a method for updating an entry in a file handle cache when such entry is accessed to service a content request in accordance with an embodiment.

FIG. 4 depicts a flowchart 400 of a method for updating an entry in a file handle cache when such entry is accessed to service a content request in accordance with an embodiment. The steps of flowchart 400 may be performed, for example, by cache management logic 122 of content serving system 112 as described above in reference to system 100 of FIG. 1 although the method is not limited to that embodiment.

As shown in FIG. 4, the method of flowchart 400 begins at step 402 in which an entry in a file handle cache is accessed to service a request for content from a file system. This step may comprise, for example, accessing an entry in file handle cache 120 to service a request for content from file system 100.

At step 404, a shared lock is acquired on the file handle cache. This step may comprise, for example, acquiring a shared lock on file handle cache 120.

At step 406, a time to live associated with the accessed entry is reset to a predetermined maximum value (e.g., 2). The time to live is used by an eviction process to determine how long the accessed entry is allowed to remain in the file handle cache. This step is analogous to operation 316 as described above in reference to sequence diagram 300.

At step 408, a hit count associated with the accessed entry is incremented. The hit count represents a number of times that the accessed entry has been accessed to service a request for content from a file system since a last time the hit count was reset. The hit count is utilized by an eviction process to identify entries for eviction from the file handle cache. This step is analogous to operation 318 as described above in reference to sequence diagram 300.

At step 410, any mark for eviction associated with the accessed entry is removed. This ensures that the entry will not be removed from the file handle cache by a second stage of an eviction process to be described herein. This step is analogous to operation 320 as described above in reference to sequence diagram 300.

At step 412, the shared lock that was acquired on the file handle cache in step 404 is released. This step may comprise, for example, releasing a shared lock on file handle cache 120. By maintaining a shared lock on the file handle cache during steps 406, 408 and 410, the method of flowchart 400 ensures that the file handle cache remains accessible to other processes that also acquire a shared lock on the file handle cache. Such processes may include other processes that access the file handle cache to service requests for content from a file system or a first stage of an eviction process to be described herein.

Figure 5:
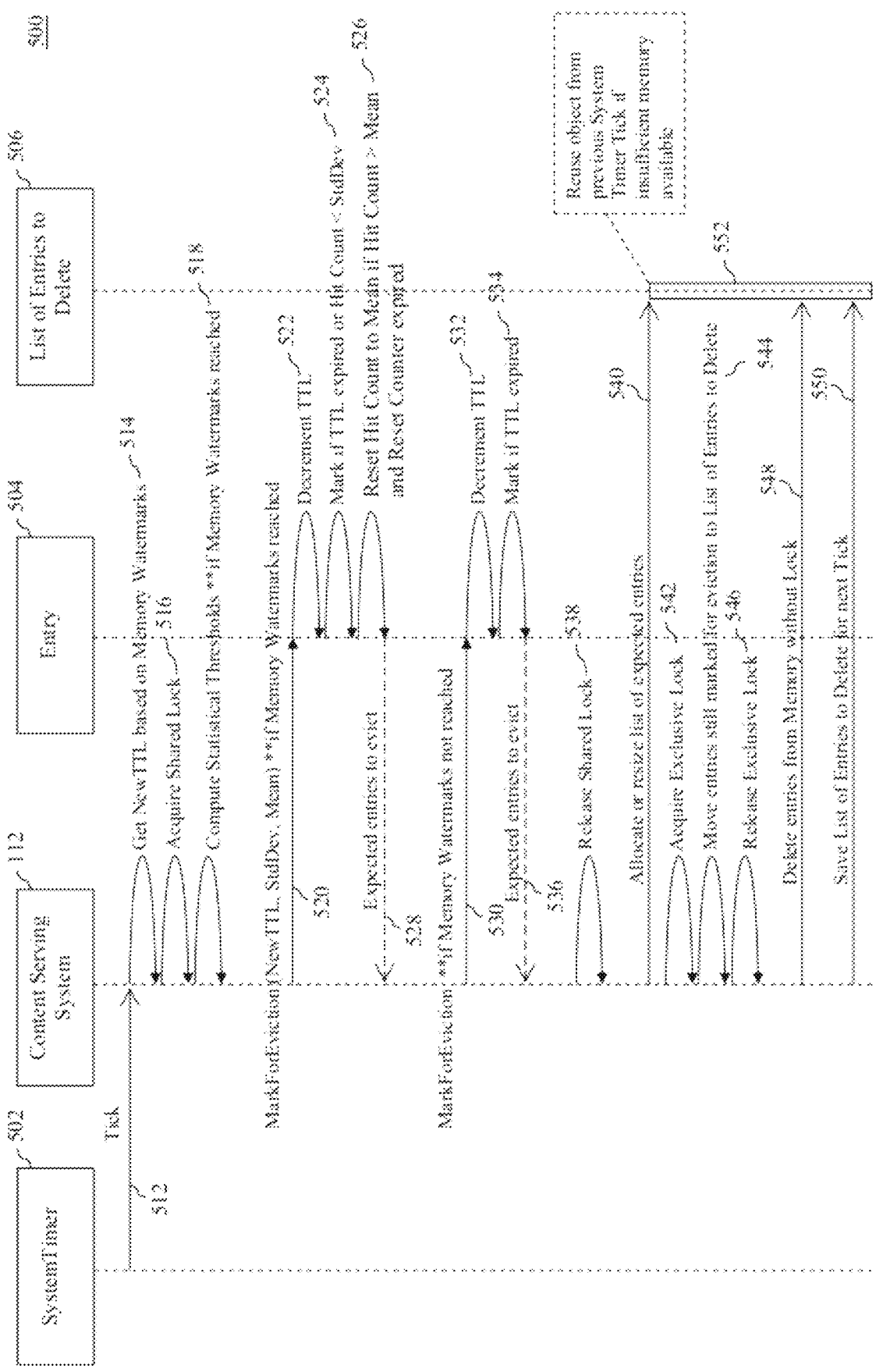
FIG. 5 is a sequence diagram that illustrates a multi-stage eviction process for a file handle cache in accordance with an embodiment.

FIG. 5 is a sequence diagram 500 that illustrates a multi-stage eviction process for a file handle cache in accordance with an embodiment. As shown in FIG. 5, the eviction process is triggered by a system timer ("System-Timer") 502 that issues a signal ("Tick") 512. Signal 512 is received by cache management logic 122 of content serving system 112, which responds by causing a number of operations to be performed that together make up the multi-stage eviction process. These operations will be described below. System timer 502 may issue signal 512 at fixed intervals so that the eviction process is performed on a periodic basis. By way of example only and without limitation, system timer 502 may issue signal 512 every 30 seconds.

The first stage of the eviction process may be thought of as beginning with operation 514 and ending with operation 538. During operation 514, cache management logic 122 may obtain a new maximum time to live ("NewTTL") depending upon a measure of system memory utilization. In particular, in one embodiment, cache management logic 122 obtains a NewTTL if the measure of system memory utilization exceeds both a first threshold, referred to herein as Memory Watermark #1, and a second threshold, referred to herein as Memory Watermark #2, wherein Memory Watermark #1 is greater than Memory Watermark #2. For example, in one embodiment, Memory Watermark #1 equals 90% system memory usage and Memory Watermark #2 equals 70% system memory usage.

After operation 514, cache management logic 122 acquires a shared lock on file handle cache 120, as represented by operation 516. By acquiring a shared lock during the first stage of the eviction process, cache management logic 122 enables other processes that can acquire shared locks on file handle cache 120 to access the cache during the first stage of the eviction process to perform content serving operations.

After the shared lock has been acquired during operation 516, cache management logic 122 determines if both Memory Watermarks have been reached. If both Memory Watermarks have been reached, then cache management logic 122 calculates one or more statistical thresholds, as represented by operation 518. Such statistical thresholds may be calculated, for example, by analyzing a hit count associated with each entry in file handle cache 120. In one embodiment, cache management logic 122 calculates both a standard deviation and a mean value based on the hit counts associated with each entry in file handle cache 120.

After operation 518, cache management logic 122 will either cause a MarkForEviction (NewTTL, StdDev, Mean) operation 520 to be performed against every entry in file handle cache 120 if both Memory Watermarks have been reached or will cause a MarkforEviction operation 530 to be performed against every entry in file handle cache 120 if only the lower Memory Watermark has been reached or no Memory Watermark has been reached. Although these operations are performed against every entry in file handle cache 120, only a single representative entry 504 is shown in FIG. 5 for the sake of simplicity.

MarkForEviction (NewTTL, StdDev, Mean) operation 520 will be described first. This operation relies on NewTTL, which was obtained as part of operation 514 as previously described, and the standard deviation and mean calculated as part of operation 518 as previously described. The performance of MarkForEviction (NewTTL, StdDev, Mean) operation 520 against an entry involves performing operations 522, 524 and 526 against the entry.

As shown in FIG. 5, operation 522 causes the time to live ("TTL") associated with an entry to be decremented. For example, in one example embodiment, the time to live associated with an entry is decremented by one. Then, operation 524 marks an entry for eviction if the decremented time to live has expired (e.g., has been reduced to zero) or if the hit count associated with the entry is less than the standard deviation calculated as part of operation 518. This has the effect of evicting entries that have grown stale (as indicated by the expired time to live) as well as entries that, while still obtaining hits, have grown relatively unpopular (as indicated by the hit count being less than the standard deviation). After operation 524, the hit count associated with the entry is reset to the mean if the hit count is greater than the mean and a fixed amount of time since a last reset of the hit count has elapsed, as represented by operation 526. Operation 526 has the effect of smoothing out large spikes in hits over time so that file handles that experience such spikes aren't given an unfair advantage in the eviction process.

Although not shown in FIG. 5, MarkForEviction (NewTTL, StdDev, Mean) operation 520 also operates to replace a time to live associated with an entry with the NewTTL obtained during operation 514. This feature enables the time to live associated with every entry in file handle cache 120 to be reduced when a measure of system memory utilization exceeds the Memory Watermarks discussed above. This will likely result in a faster eviction of entries from file handle cache 120, thereby causing files to be closed more quickly and system memory utilization to be reduced.

As shown in FIG. 5, the performance of MarkForEviction (NewTTL, StdDev, Mean) operation 520 against every entry in file handle cache 120 results in the generation of an expected number of entries to evict 528.

MarkForEviction operation 530 will now be described. The performance of MarkForEviction operation 530 against an entry involves performing operations 532 and 534 against the entry.

As shown in FIG. 5, operation 532 causes the time to live ("TTL") associated with an entry to be decremented. For example, in one example embodiment, the time to live associated with an entry is decremented by one. Then, operation 532 marks an entry for eviction if the decremented time to live has expired (e.g., has been reduced to zero). This has the effect of evicting entries that have grown stale (as indicated by the expired time to live).

As shown in FIG. 5, the performance of MarkForEviction operation 530 against every entry in file handle cache 120 results in the generation of an expected number of entries to evict 536.

After operation 528 or 536 has completed, cache management logic 122 releases the shared lock acquired on file handle cache 120, as represented by operation 538.

During operation 540, cache management logic 122 allocates or resizes a list of entries to delete 506 based on the expected number of entries to evict returned as part of operation 528 or operation 536. List of entries to delete 506 is intended to hold references to the entries to be evicted.

Following operation 540, a second stage of the eviction process is carried out. This second stage may be thought of as beginning with operation 542 and ending with operation 546. During operation 542, cache management logic 122 acquires an exclusive lock on file handle cache 120. Following operation 542, cache management logic 122 stores a reference to entries marked for eviction in list of entries to delete 506 and then removes such entries from file handle cache 120. It is noted that some entries marked for eviction as part of the first stage of the eviction process may have been unmarked due to cache accesses that occurred after the marking operation but before the exclusive lock was obtained. Thus, the list of entries to delete 506 may be thought of as an estimate of the actual entries to be deleted. Finally, during operation 546, cache management logic 122 releases the exclusive lock on file handle cache 120.

After the exclusive lock is released, cache management logic 122 causes the files associated with the file handles included in list of entries to delete 506 to be closed with acquiring any lock on file handle cache 120. In this manner, only low-cost operations involving removing entries from file handle cache 120 are performed while maintaining an exclusive lock on file handle cache 120, thereby minimizing the amount of time that content serving system 112 is unable to access file handle cache 120 to service content requests. Closing a file may also result in the file being deleted from system memory and optionally from disk, depending upon the implementation.

During operation 550, cache management logic 122 saves list of entries to delete 506 for the next Tick (i.e., the next iteration of the eviction process). As indicated by reference numeral 552, if the attempt to allocate or resize list of entries to delete 506 that occurs as part of operation 540 fails due to insufficient memory being available, list of entries to delete 506 associated with the last successfully-allocated list may be used to drive the closing of files in operation 548.

Figure 6:
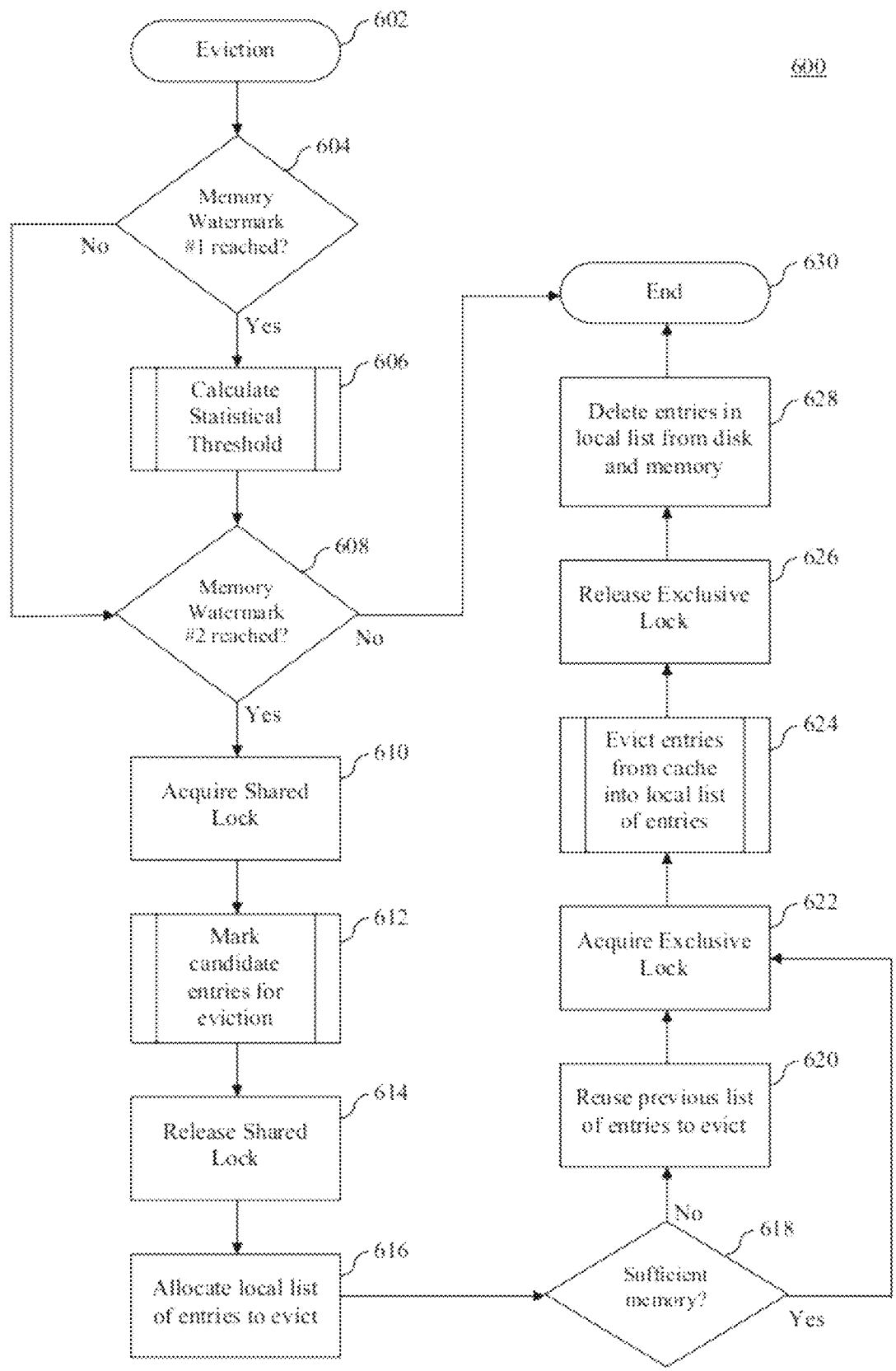
FIG. 6 depicts a flowchart of a multi-stage eviction process for a file handle cache in accordance with an embodiment.

FIG. 6 depicts a flowchart 600 of a multi-stage eviction process for a file handle cache in accordance with an embodiment. The steps of flowchart 600 may be performed, for example, by cache management logic 122 of content serving system 112 as described above in reference to system 100 of FIG. 1 although the method is not limited to that embodiment.

As shown in FIG. 6, the method of flowchart 600 begins at step 602 in which the eviction process is initiated. This step may comprise, for example, initiating the eviction process in response to receiving a signal from a system timer, such as system timer 502.

At decision step 604, it is determined whether a measure of system memory utilization has reached Memory Watermark #1. As discussed above, Memory Watermark #1 may comprise the larger of two thresholds used to gauge the extent to which system memory has been consumed. If Memory Watermark #1 has not been reached, then control immediately flows to decision step 608. If Memory Watermark #1 has been reached, then statistical thresholds are first calculated as shown at step 606. Such statistical thresholds may be calculated, for example, by analyzing a hit count associated with each entry in the file handle cache against which the eviction process is being performed. The statistical thresholds may be calculated by obtaining a shared lock on the file handle cache. In one embodiment, the statistical thresholds are calculated by calculating both a standard deviation and a mean value based on the hit counts associated with each entry in the file handle cache.

At decision step 608, it is determined whether the measure of system memory utilization has reached Memory Watermark #2. As discussed above, Memory Watermark #2 may comprise the smaller of the two thresholds used to gauge the extent to which system memory has been consumed. If it is determined at decision step 608 that Memory Watermark #2 has not been reached, then the eviction process is terminated at step 630 and no entries are removed from the file handle cache. However, if it is determined at decision step 608 that Memory Watermark #2 has been reached then control flows to step 610.

At step 610, a shared lock is acquired on the file handle cache. While the shared lock is maintained, candidate entries in the file handle cache are marked for eviction as shown at step 612. This may involve performing the following operations against each entry: decrementing a time to live associated with the entry and then marking the entry for eviction if the decremented time to live has expired (e.g., has reached zero); and, if Memory Watermark #1 has been reached, marking the entry for eviction if a hit count associated with the entry is less than a standard deviation calculated during step 606. This step may further involve resetting a hit count associated with the entry to a mean calculated during step 606 if the hit count is greater than the mean and a fixed amount of time since a last reset of the hit count has elapsed. Note that if, after step 610, no entries in the file handle cache are marked for eviction, then the eviction process may be terminated.

After step 612, the shared lock that was initially acquired on the file handle cache during step 610 is released.

During step 616, a local list of entries is allocated to hold references to the entries to be evicted. At decision step 618, it is determined whether there is sufficient system memory available to allocate such a list. If there is not enough memory, then a list that was generated during a previous iteration of the eviction process may be re-used as shown at step 620.

At step 622, an exclusive lock is acquired on the file handle cache. While the exclusive lock is maintained, references to entries marked for eviction in the file handle cache are stored in the list of entries to evict and then such entries are removed from the file handle cache. At step 626, the exclusive lock that was initially acquired on the file handle cache during step 622 is released.

At step 628, the files associated with file handles identified in the local list of entries to evict are closed. This, in turn, may cause the content of such files to be deleted from system memory and optionally from disk.

At step 630, the eviction process terminates.

Figure 7:
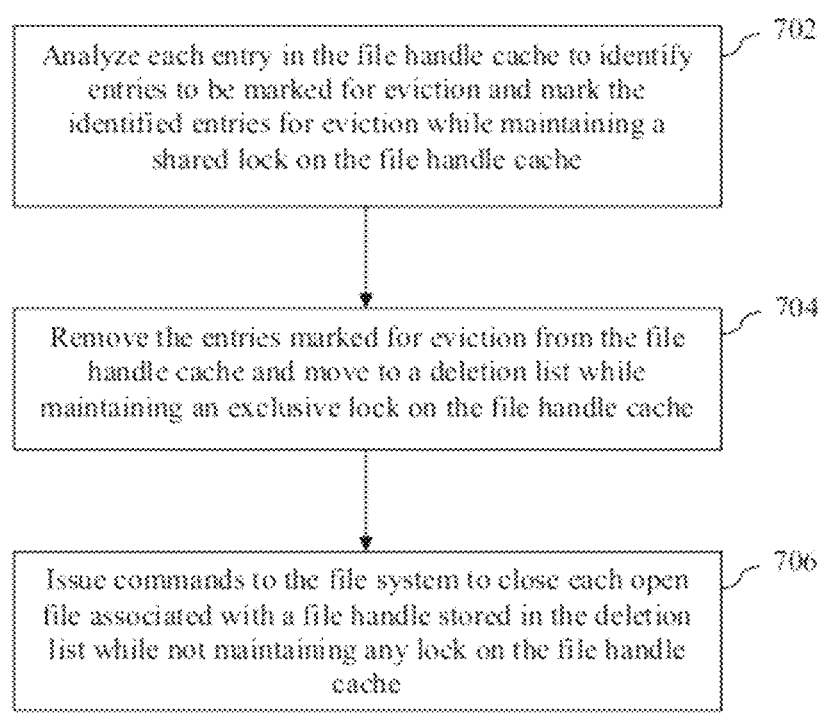
FIG. 7 depicts a flowchart of a method for evicting entries from a file handle cache in accordance with an embodiment.

FIG. 7 depicts a flowchart 700 of a method for evicting entries from a file handle cache in accordance with an embodiment. As shown in FIG. 7, the method of flowchart 700 begins at step 702, during which each entry in the file handle cache is analyzed to identify entries to be marked for eviction and identified entries are marked for eviction while maintaining a shared lock on the file handle cache.

During step 704, the entries marked for eviction are removed from the file handle cache and moved to a deletion list while maintaining an exclusive lock on the file handle cache.

During step 706, commands are issued to the file system to close each open file associated with a file handle stored in the deletion list while not maintaining any lock on the file handle cache.

Figure 8:
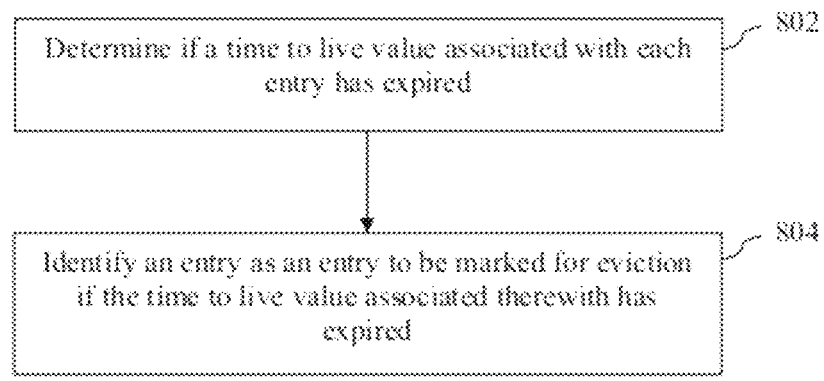
FIG. 8 depicts a flowchart of a method for identifying an entry in a file handle cache as an entry to be marked for eviction in accordance with an embodiment.

FIG. 8 depicts a flowchart 800 of a method for identifying an entry in a file handle cache as an entry to be marked for eviction in accordance with an embodiment. As shown in FIG. 8, the method of flowchart 800 beings at step 802 in which it is determined whether a time to live value associated with each entry has expired. At step 804, an entry is identified as an entry to be marked for eviction if the time to live value associated therewith has expired.

Figure 9:
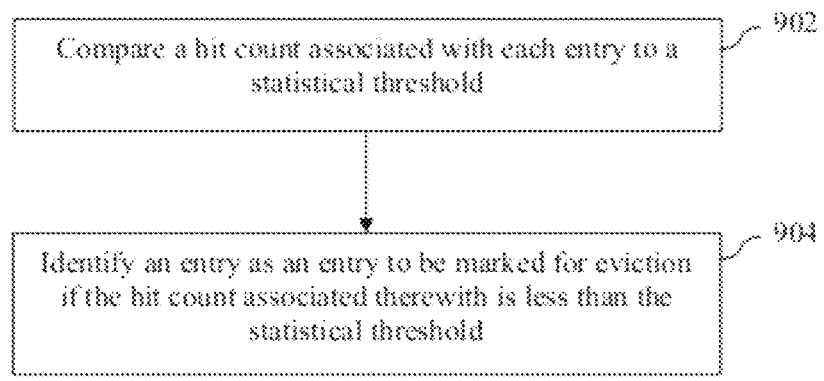
FIG. 9 depicts a flowchart of a method for identifying an entry in a file handle cache as entry to be marked for eviction in accordance with an embodiment.

FIG. 9 depicts a flowchart 900 of a method for identifying an entry in a file handle cache as entry to be marked for eviction in accordance with an embodiment. As shown in FIG. 9, the method of flowchart 900 begins at step 902 in which a hit count associated with each entry is compared to a statistical threshold. At step 904, an entry is identified as an entry to be marked for eviction if the hit count associated therewith is less than the statistical threshold.

IV. Example Computer System Implementations

Figure 10:
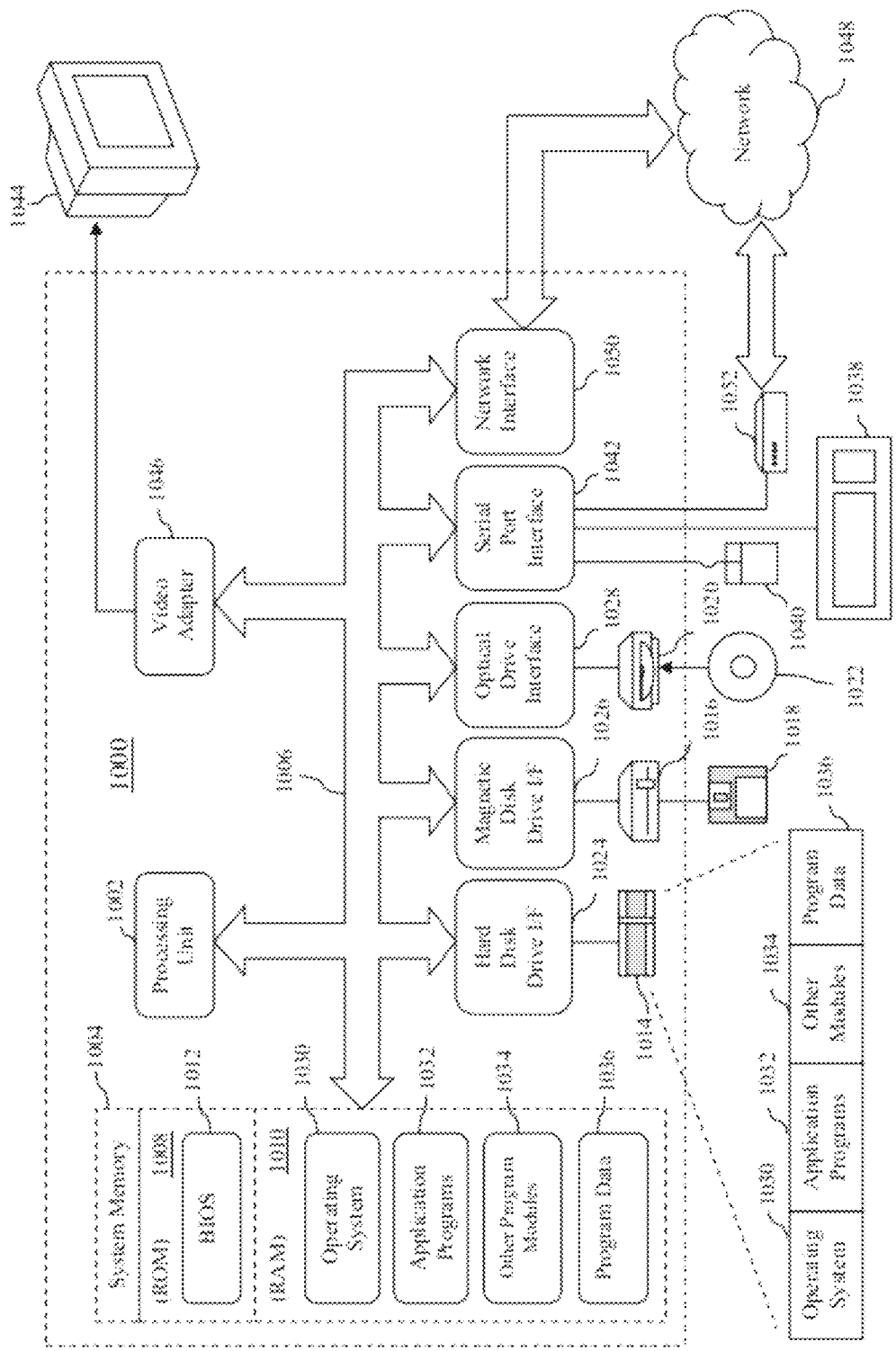
FIG. 10 is a block diagram of an example computer system that may be used to implement various embodiments described herein.

FIG. 10 depicts an example computer system 1000 that may be used to implement various embodiments described herein. For example, computer system 1000 may be used to implement any of the following previously-described elements: server 102, content serving system 112, cache management logic 122, file system 114, client 104, clients $202_1$-$202_2$, servers $204_1$-$204_3$, and server 206, as well as any sub-components thereof. The description of computer system 1000 provided herein is provided for purposes of illustration, and is not intended to be limiting. Embodiments may be implemented in further types of computer systems, as would be known to persons skilled in the relevant art(s).

As shown in FIG. 10, computer system 1000 includes a processing unit 1002, a system memory 1004, and a bus 1006 that couples various system components including system memory 1004 to processing unit 1002. Processing unit 1002 may comprise one or more processors or processing cores. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computer system 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1030, one or more application programs 1032, other program modules 1034, and program data 1036. In accordance with various embodiments, the program modules may include computer program logic that is executable by processing unit 1002 to perform any or all of the functions and features of server 102, content serving system 112, cache management logic 122, file system 114, client 104, clients $202_1$-$202_2$, servers $204_1$-$204_3$, and server 206, as well as any sub-components thereof. The program modules may also include computer program logic that, when executed by processing unit 1002, performs any of the steps or operations shown or described in reference to FIGS. 3-9.

A user may enter commands and information into computer system 1000 through input devices such as a keyboard 1038 and a pointing device 1040. Other input devices (not shown) may include a microphone, joystick, game controller, scanner, or the like. In one embodiment, a touch screen is provided in conjunction with a display 1044 to allow a user to provide user input via the application of a touch (as by a finger or stylus for example) to one or more points on the touch screen. These and other input devices are often connected to processing unit 1002 through a serial port interface 1042 that is coupled to bus 1006, but may be connected by other interfaces, such as a parallel port, game port, or a universal serial bus (USB).

A display 1044 is also connected to bus 1006 via an interface, such as a video adapter 1046. In addition to display 1044, computer system 1000 may include other peripheral output devices (not shown) such as speakers and printers.

Computer system 1000 is connected to a network 1048 (e.g., a local area network or wide area network such as the Internet) through a network interface 1050, a modem 1052, or other means for establishing communications over the network. Modem 1052, which may be internal or external, is connected to bus 1006 via serial port interface 1042.

As used herein, the terms "computer program medium" and "computer-readable medium" are used to generally refer to non-transitory media such as the hard disk associated with hard disk drive 1014, removable magnetic disk 1018, removable optical disk 1022, as well as other media such as flash memory cards, digital video disks, random access memories (RAMs), read only memories (ROM), and the like.

As noted above, computer programs and modules (including application programs 1032 and other program modules 1034) may be stored on the hard disk, magnetic disk, optical disk, ROM, or RAM. Such computer programs may also be received via network interface 1050 or serial port interface 1042. Such computer programs, when executed by processing unit 1002, enable computer system 1000 to implement features of embodiments discussed herein. Accordingly, such computer programs represent controllers of computer system 1000.

Embodiments are also directed to computer program products comprising software stored on any computer-readable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

In alternative implementations, each of server 102, content serving system 112, cache management logic 122, file system 114, client 104, clients $202_1$-$202_2$, servers $204_1$-$204_3$, and server 206, as well as any sub-components thereof may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for evicting entries from a file handle cache, each entry in the file handle cache storing a file handle associated with an open file in a file system, the method comprising:
    analyzing each entry in the file handle cache to identify entries to be marked for eviction and marking the identified entries for eviction while maintaining a shared lock on the entire file handle cache, the shared lock allowing the file handle cache to be concurrently accessed by one or more processes to obtain file handles for use in servicing requests for content from the file system; and
    removing the entries marked for eviction from the file handle cache while maintaining an exclusive lock on the entire file handle cache, the exclusive lock preventing the file handle cache from being concurrently accessed by the one or more processes.

2. The method of claim 1, wherein removing the entries marked for eviction from the file handle cache comprises moving the entries marked for eviction to a deletion list, the method further comprising:
    issuing commands to the file system to close each open file associated with a file handle stored in the deletion list while not maintaining any lock on the file handle cache.

3. The method of claim 2, further comprising deleting content from one or more of system memory and a disk that is associated with each file that is closed by the file system.

4. The method of claim 1, wherein analyzing each entry in the file handle cache to identify entries to be marked for eviction comprises:

determining if a time to live value associated with each entry has expired; and identifying an entry as an entry to be marked for eviction if the time to live value associated therewith has expired.

5. The method of claim 4, wherein determining if the time to live value associated with each entry has expired comprises:

decrementing the time to live value associated with a particular entry in the file handle cache; and determining if the decremented time to live value is zero.

6. The method of claim 4, wherein analyzing each entry in the file handle cache to identify entries to be marked for eviction further comprises:

modifying the time to live value associated with each entry if a measure of system memory utilization exceeds a threshold.

7. The method of claim 1, wherein analyzing each entry in the file handle cache to identify entries to be marked for eviction comprises:

comparing a hit count associated with each entry in the file handle cache to a statistical threshold, the hit count associated with each entry representing a number of times that the entry was accessed to service a request for content from the file system; and identifying a particular entry in the file handle cache as an entry to be marked for eviction if the hit count associated therewith is less than the statistical threshold.

8. The method of claim 7, further comprising:

calculating the statistical threshold based on the hit counts associated with all of the entries in the file handle cache.

9. The method of claim 8, wherein calculating the statistical threshold based on the hit counts associated with all of the entries in the file handle cache comprises calculating a standard deviation based on the hit counts associated with all of the entries in the file handle cache.

10. The method of claim 7, further comprising:

resetting a particular hit count associated with a particular entry in the file handle cache if a predetermined amount of time has elapsed since a last time that the particular hit count associated with the particular entry was reset, wherein each entry of the file handle cache is associated with a respective hit count.

11. The method of claim 10, further comprising:

calculating a mean value based on the hit counts associated with all of the entries in the file handle cache;

wherein resetting the particular hit count associated with the particular entry comprises resetting the particular hit count associated with the particular entry to the mean value.

12. A system, comprising:

at least one processor;

memory connected to the at least one processor;

a file system stored at least in part in the memory and executed by the at least one processor; and a content serving system stored at least in part in the memory and executed by the at least one processor, the content serving system being configured to service requests for content by accessing files on the file system, the content serving system including:

a file handle cache having a plurality of entries, each entry in the file handle cache storing a file handle associated with an open file in the file system, the file handle cache being accessible to obtain file handles for accessing open files on the file system; and file handle cache management logic that is configured to analyze a time to live counter assigned to each entry in the file handle cache and to mark an entry for eviction if the time to live counter assigned thereto has expired, the value of the time to live counter that is assigned to each entry in the file handle cache being adaptively determined based on a measure of utilization of a system memory that stores contents of each open file associated with each file handle stored in the file handle cache, the system memory being a different entity than the file handle cache.

13. The system of claim 12, wherein the file handle cache management logic is configured to analyze the time to live counter assigned to each entry in the file handle cache and to mark an entry for eviction if the time to live counter assigned thereto has expired while maintaining a shared lock on the file handle cache.

14. The system of claim 13, wherein the file handle cache management logic is further configured to remove each entry marked for eviction from the file handle cache while maintaining an exclusive lock on the file handle cache.

15. The system of claim 12, wherein the value of the time to live counter that is assigned to each entry in the file handle cache is adaptively assigned based on whether the measure of system memory utilization exceeds a first threshold and a second threshold.

16. A system, comprising:

at least one processor;

a memory connected to the at least on processor;

a file system stored at least in part in the memory and executed by the at least one processor;

a file handle cache stored at least in part in the memory, each entry in the file handle cache storing a file handle associated with an open file in the file system; and file handle cache management logic configured to:

analyze each entry in the file handle cache to identify entries to be marked for eviction and mark the identified entries for eviction while maintaining a shared lock on the entire file handle cache, the shared lock allowing the file handle cache to be concurrently accessed by one or more processes to obtain file handles for use in servicing requests for content from the file system; and remove the entries marked for eviction from the file handle cache while maintaining an exclusive lock on the entire file handle cache, the exclusive lock preventing the file handle cache from being concurrently accessed by the one or more processes.

17. The system of claim 16, wherein the file handle cache management logic is configured to remove the entries marked for eviction from the file handle cache by moving the entries marked for eviction to a deletion list, the file handle cache management logic further configured to:

issue commands to the file system to close each open file associated with a file handle stored in the deletion list while not maintaining any lock on the file handle cache.

18. The system of claim 17, wherein the file handle cache management logic is configured to delete content from one or more of system memory and a disk that is associated with each file that is closed by the file system.

19. The system of claim 16, wherein the file handle cache management logic is configured to analyze each entry in the file handle cache to identify entries to be marked for eviction by:

determining if a time to live value associated with each entry has expired; and identifying an entry as an entry to be marked for eviction if the time to live value associated therewith has expired.

20. The system of claim 19, wherein the file handle cache management logic is configured to determine if the time to live value associated with each entry has expired by:
  decrementing the time to live value associated with a particular entry in the file handle cache; and
  determining if the decremented time to live value is zero.

\* \* \* \* \*